(12) United States Patent
Choi et al.

(10) Patent No.: US 7,837,345 B2
(45) Date of Patent: Nov. 23, 2010

(54) AQUATIC LIGHT EMITTING DEVICE

(75) Inventors: Gi-Seung Choi, Gunsan-si (KR);
Jong-Chan Lee, Osan-si (KR); In-Sung Her, Euiwang-si (KR); Hyo-Jin Weon, Suwon-si (KR); Min-Su Kim, Suwon-si (KR)

(73) Assignee: Kumho Electric, Inc., Seoul (KR)

( * ) Notice: Subject to any disclaimer, the term of this patent is extended or adjusted under 35 U.S.C. 154(b) by 2 days.

(21) Appl. No.: 12/146,609

(22) Filed: Jun. 26, 2008

(65) Prior Publication Data

US 2009/0303700 A1 Dec. 10, 2009

(30) Foreign Application Priority Data

Jun. 5, 2008 (KR) .................... 10-2008-0053052

(51) Int. Cl.
*F21V 33/00* (2006.01)

(52) U.S. Cl. .................. 362/101; 362/183; 362/551

(58) Field of Classification Search ................ 362/101, 362/183, 555, 565
See application file for complete search history.

(56) References Cited

U.S. PATENT DOCUMENTS 3,942,859 A * 3/1976 Korodi .................. 439/490
5,237,490 A * 8/1993 Ferng .................... 362/183
6,220,718 B1 * 4/2001 Burgess .................. 362/101
2002/0085392 A1 * 7/2002 Hajianpour .............. 362/562

* cited by examiner

*Primary Examiner*—Jong-Suk (James) Lee
*Assistant Examiner*—Julie A Shallenberger
(74) *Attorney, Agent, or Firm*—Holme Roberts & Owen LLP

(57) ABSTRACT

An aquatic light emitting device comprising a plurality of point light emitting units and a plurality of linear light emitting units is disclosed. The point light emitting unit comprises a floating member, a light source part, and a power supply part. The floating member includes a hollow body which has an internal space isolated from the outside so as to give buoyancy, one or more junction portions formed on an outer surface thereof, and has a light inlet opening formed on an upper part, and a string connected to a lower surface of the hollow body. The light source part is attached to the upper surface of the floating member, has an isolated internal space with light outlet openings provided at the upper and lower surfaces thereof, and a light source and a light source control circuit contained in the isolated internal space. The power supply part is located on the upper surface of the light source part and includes a solar cell. The linear light emitting unit comprises at least one optical fiber which is introduced into the hollow body through a hole formed at the junction portion, one end of which is arranged at the light inlet opening of the hollow body, and part of which extends outwards through the junction portion, and is surrounded by a transparent tube.

3 Claims, 2 Drawing Sheets

AQUATIC LIGHT EMITTING DEVICE

CROSS-REFERENCE TO RELATED APPLICATIONS

This application claims priority from Korean Patent Application No. 10-2008-0053052 filed on Jun. 5, 2008, the contents of which are incorporated herein by reference in its entirety.

BACKGROUND OF THE INVENTION

The present invention relates to an aquatic light emitting device in which power is supplied semi-permanently through a solar cell, and one end of an optical fiber is disposed at a lower portion of a power source and light is transmitted to the other end of the optical fiber, whereby the light is diffused and scattered through the optical fiber to indicate a specific region in the line shape.

Recently, marine transportation means have been developed that are frequently sailed on the sea or on rivers. Accordingly, risks such as natural hazards in the sea, sunken ships, and the like have increased and the protection of fisheries, fish farming and the like have increased. As a result, an artificial construction (nautical mark) notifying a hazardous region or a specific construction has been required. Also, this artificial construction performs the auxiliary function of navigation regulation.

Since a nautical mark, in particular, a light on-off device mounted to a floating member is operated unattended and is not easily managed because of geographical factors, there is a need to supply a stable power source and maintenance and repair are continuously required.

In particular, a bulb type light on-off device using a white bulb is manufactured and operated such that a plurality of white bulbs are mounted to a mechanical structure such as a bulb exchanger and a disordered bulb in which a filament is disconnected is automatically replaced with a spare bulb by controlling a small-sized motor provided in the mechanical structure.

However, the white light bulb is a light source in which heat is converted into light by means of the filament and has the problems of overheating caused by long term use, vibrations caused by waves, shocks caused by collisions between a ship and the light on-off devices and so on. In addition, the bulb exchanger used in the bulb type light on-off device has a structure in which the small-sized motor is coupled with a reduction gear unit, and so the bulb exchanger is frequently out of order due to a breakdown in the gear unit.

In order to compensate for the above drawbacks, a light on-off device employing a light emitting diode (LED) has been developed. However, since the light on-off device utilizing LEDs is integrally assembled in one body for protection from water, vibration and so on, it is difficult to repair the light on-off device using an LED on the sea and the whole light on-off device has to be replaced if it breaks down, and so the cost for maintenance and repair is increased.

Further, since the light on-off device is installed on a floating member, a hazardous region is indicated by points with certain intervals so that its perceptivity is lowered.

SUMMARY OF THE INVENTION

Accordingly, an object of the present invention is to provide an aquatic light emitting device that semi-permanently supplies power using a solar cell, arranges one end surface of an optical fiber to the bottom side of a power supply, and scatters and emits light incident from the one end surface of the optical fiber through the optical fiber so that a region is displayed in line.

In order to accomplish the object above, an aquatic light emitting device according to the present invention comprises a plurality of point light emitting units and a plurality of linear light emitting units. The point light emitting unit comprises a floating member, a light source part, an upper light emitting body, and a power supply part. The floating member includes a hollow body which has an internal space isolated from the outside so as to give buoyancy, one or more junction portions formed on an outer surface thereof, a light inlet opening formed on an upper part, and a string connected to a lower surface of the hollow body. The light source part is attached to the upper surface of the floating member, has an isolated internal space with light outlet openings provided at the upper and lower surfaces thereof, and a light source and a light source control circuit contained in the isolated internal space. The upper light emitting body is attached on the light outlet opening provided at the upper surface of the light source part. The power supply part is located on the upper surface of the upper light emitting body and includes a solar cell. The linear light emitting unit comprises at least one optical fiber which is introduced into the hollow body through a hole formed at the junction portion, one end of which is arranged at the light inlet opening of the hollow body, and part of which extends outwards through the junction portion, and is surrounded by a transparent tube.

BRIEF DESCRIPTION OF THE DRAWINGS

The above and other features and advantages of the present invention will be apparent from the following detailed description in conjunction with the accompanying drawings wherein.

DESCRIPTION OF SPECIFIC EMBODIMENTS

Hereinafter, the preferred embodiment of the present invention is described in detail with reference with the accompanying drawings.

Figure 1:
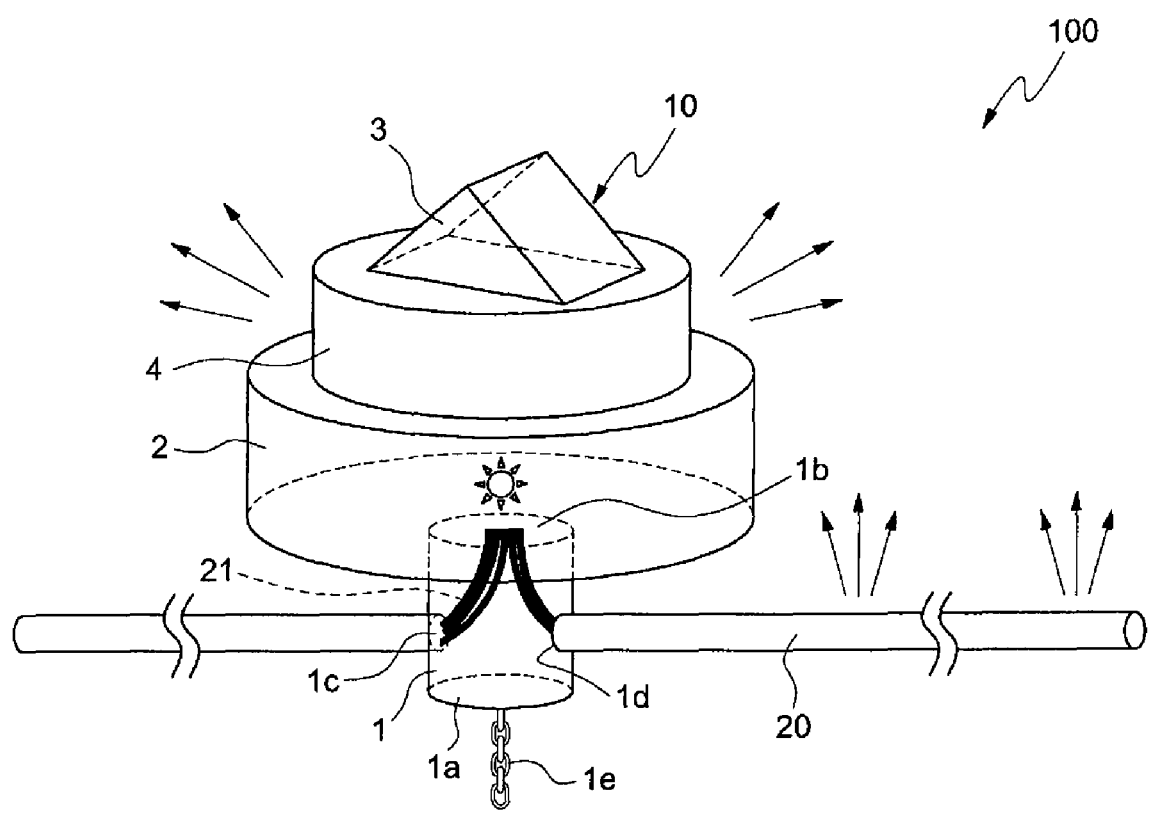
FIG. 1 is a perspective view of a point light emitting unit and two linear light emitting units constituting an aquatic light emitting device according to the present invention.
Figure 2:
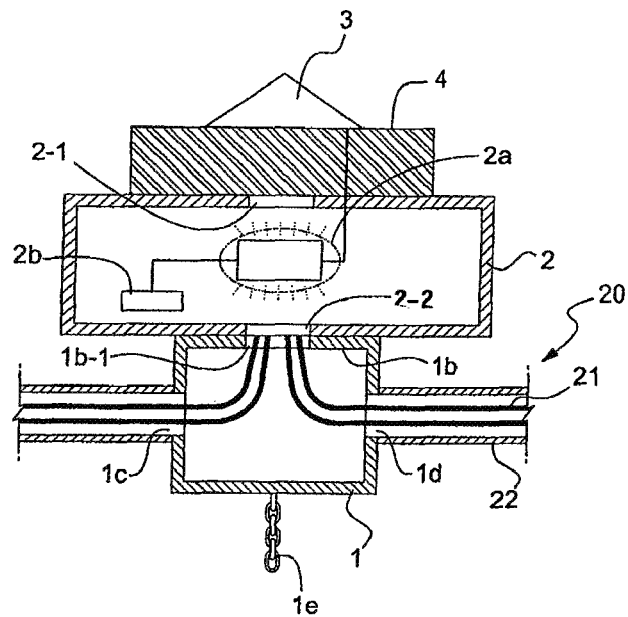
FIG. 2 is a cross-sectional view of FIG. 1.

FIG. 1 is a perspective view of a point light emitting unit and two linear light emitting units constituting an aquatic light emitting device according to the present invention and FIG. 2 is a cross-sectional view of FIG. 1.

The aquatic light emitting device 100 according to the present invention comprises a point light emitting unit 10 and a linear light emitting unit 20. The point light emitting unit 10 comprises a floating member 1, a light source part 2 and a power supply part 3, and the linear light emitting unit 20 includes an optical fiber 21 surrounded by a transparent tube 22. The aquatic light emitting device illustrated in FIG. 1 and FIG. 2 is an example according to one embodiment of the present invention.

The floating member 1 is a cylindrical or polygonal hollow body. The lower part of the hollow body may be equal to or larger than the upper part in outer circumference. The hollow body has an upper surface 1b, a lower surface 1a and junction portions 1c and 1d formed thereon.

The cylindrical floating member 1 is illustrated as one example. A housing of the floating member 1 can be made of material with a light weight and adequate strength, for example, such as polyester synthetic resin reinforced with glass fiber, a polycarbonate and a corrosion resistant aluminum alloy. An internal space part isolated from the outside is formed in the hollow body of the floating member, and the internal space part is filled with an inert gas with stable chemical and physical properties such as air, at normal pressure. A tying string 1e connected to a bottom of sea or river may be secured to the lower surface 1a of the floating member 1 in order to fix the position of the floating member 1, and the light source part 2 is mounted to the upper surface 1b of the floating member 1.

Further, one or more junction portions 1c and 1d are formed on a periphery of the floating member 1 and at least one optical fiber 21 of the linear light emitting unit 20 pass through openings formed in the formed junction portions 1c and 1d. The junction portions 1c and 1d should be sealed hermetically so as to not permit water to flow into the floating member 1.

The number of the junction portions may be determined on the basis of the location at which the aquatic light emitting device 100 is disposed, and the shape of the region to be indicated. The junction portions may be formed on the points of the floating member 1 at which a central line of the floating member 1 passes or can make a certain angle with a central line of the floating member 1.

FIG. 1 and FIG. 2 show that, in order to arrange the linear limiting units 20 in one line, two junction parts 1c and 1d are formed at opposite points of the floating member at which a central line of the floating member 1 passes.

One end of each of the optical fibers 21 entered through openings formed on the junction portions 1c and 1d of the floating member 1 is fixed on the upper surface 1b of the floating member 1, the light transmitted to the optical fiber 21 fixed to the upper surface 1b is transmitted to the other end of the optical fiber 21 while being scattered and emitted along the optical fiber 21.

A light inlet opening 1b-1 is formed on the upper surface 1b of the floating member 1 to enable one end of optical fiber 21 to be arranged hermetically and fixedly in the light inlet opening 1b-1. In addition, a transparent material may be attached in the light inlet opening 1b-1 so that the light emitted from the light source 2a can be transmitted to one end of the optical fiber 21 through the lower light outlet opening 2-2 formed on the lower surface of the light source part 2 and a transparent material and enable the linear light emitting unit 20 to emit the light.

The junction portions 1c and 1d may be positioned under the water level, and the optical fiber which extended outward from the junction portions 1c and 1d may be used as the linear light emitting part at a predetermined depth in the water.

The upper surface 1b of the floating member 1 is fixed to a bottom surface of the light source part 2, and the light source part 2 has an internal space formed therein and isolated from an outside. An upper light outlet opening 2-1 and a lower light outlet opening 2-2 are formed on the upper surfaces and the lower surfaces of the light source part 2 and a light source control circuit 2b and a light source 2a are provided in the internal space of the light source part 2.

As the light source 2a provided in the light source part 2, a light emitting diode (LED) connected electrically to the power supply part 3 may be used, and a plurality of light sources may be utilized.

In the embodiment illustrated in FIG. 1 and FIG. 2, an upper light emitting body 4 formed of light conductive material is provided above the light source part 2. The light emitted from the light source 2a is transmitted to the upper light emitting body 4 through the light outlet opening 2-1 formed on the upper surface of the light source part 2 and then radiated upward through the upper light emitting body 4 to display a location of the floating member 1. Simultaneously, the light emitted from the light source 2a is transmitted laterally along the linear light emitting units 20 through the light outlet opening 2-1 formed on the lower surface of the light source part 2 so as to enable the linear light emitting units 20 to act as the linear light source.

The light source part 2 may be further provided with a filter knot shown) for controlling a color of the light according to a function of the aquatic light emitting device 100 and may employ the light emitting diodes emitting various colored lights. Accordingly, for example, it is possible to control the light emitting diodes to emit red colored light in a hazardous region and to emit blue colored light for a safe navigation route.

The plastic optical fiber (POF) may be employed as the optical fiber 21 of the linear light emitting unit 20. Due to a strong corrosion resistivity and self water-proof function, the plastic optical filer can be used conveniently in the water. Also, due to its flexibility, the plastic optical fiber is valuable as a nautical mark.

Further, since the optical fiber itself acts as a light emitting body, the risk of electrical leakage may be reduced, and as a source of break down is mainly restricted to the power supply part installed in the floating member, it is easy to maintain and repair the aquatic light emitting device 100.

One or more numbers of the optical fibers may be utilized. In a case where a plurality of optical fibers 21 are used as the light emitting body, a plurality of optical fibers 21 surrounded by a transparent tube 22 may be used as one light emitting body.

The power supply part 3 supplying power the light source 2a of the light source part 2 is mounted to an upper surface of the upper light emitting body 4 and includes a solar cell (not shown) connected electrically to the power light source 2a of the light source part 2, a charger and a power supply control circuit (not shown) which are electrically connected to the solar cell.

The solar cell is a photoelectric cell manufactured for the purpose of converting solar energy to electrical energy, the photoelectric cell utilizes a photo-electromotive force generated by the photoelectrical effect caused when light is illuminated on a contact surface between the metal and the semiconductor or on a PN junction of a semiconductor. That is, the incident light excites free electron (−) and hole (+) to be able to freely move in the semiconductor and an electric field formed at PN junction causes current to flow. In the meantime, functions of the solar cell, the charger and the power supply control circuit and their relation are well known by those skilled in the art, and so the detail description thereon is omitted.

Since the power is supplied by using solar energy, the aquatic light emitting device of the present invention can be semi-permanently used and is an environment-friendly device.

Figure 3:
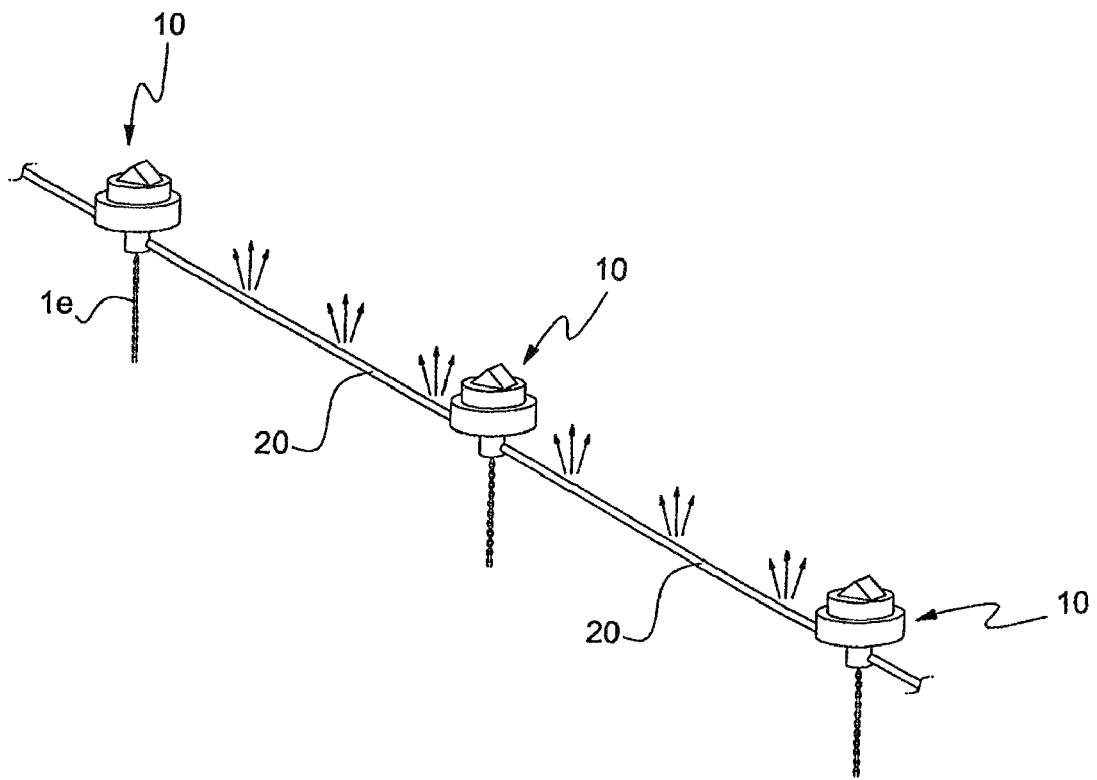
FIG. 3 is a schematic view of the aquatic light emitting device including a plurality of point light emitting units and light emitting units according to the present invention and disposed in water (the sea or a river).

FIG. 3 is a schematic view of the aquatic light emitting devices according to the present invention including a plurality of point light emitting units and linear light emitting units arranged in the water (sea or river).

The plurality of point light emitting units 10 may be arranged linearly in the water or on a surface of the water to use as nautical marks and may be connected to each other by the linear light emitting units 20.

In FIG. 3, the pair of junction portions are formed at both sides of the point light emitting unit 10 at which a central line of the linear light emitting unit 20 passes, and the optical fiber encompassed by the transparent tube is extended out of the junction portion and connected to the junction portion of the adjacent point light emitting unit.

Accordingly, a linear light emitting body is formed from the first point light emitting unit to the third point light emitting unit, the length of the overall light emitting body can be increased if a plurality of the point light emitting units 10 are arranged and connected to each other by the linear light emitting units 20.

As described above, according to the present invention, the light emitted from a single light source or a small number of light sources is transmitted effectively over a long distance so that a specific area can be indicated by the light emitting device at night without a discontinuous point to increase perceptivity. In addition, since the power is supplied through a solar cell, it is convenient to maintain and repair the aquatic light emitting device. In particular, the light emitting part is constructed with the optical fiber so that the durability can be enhanced and the risk of electric leakage can be reduced.

Although the present invention has been described with reference to the preferred embodiments thereof, it should be understood that numerous other modifications and embodiments can be devised by those skilled in the art that will fall within the spirit and scope of the principles of this disclosure. More particularly, various variations and modifications are possible to the component parts and/or arrangements of the subject combination arrangement within the scope of the disclosure, the drawings and appended claims. In addition to variations and modifications to the component parts and/or arrangements, alternative uses will also be apparent to those skilled in the art.

What is claimed is:

1. An aquatic light emitting device comprising: a plurality of point light emitting units and a plurality of linear emitting units for connecting the adjacent point light emitting units, wherein
   each point light emitting unit comprises:
   a floating member part including a hollow body which has an internal space isolated from the outside so as to give buoyancy, one or more junction portions formed on an outer surface thereof, a light inlet opening formed on an upper part, and a string connected to a lower surface of the hollow body;
   a light source part attached to the upper surface of the floating member, having an isolated internal space with an upper light outlet opening provided at the upper surface and a lower light outlet opening provided at the lower surface thereof and a light source comprising a light emitting diode (LED) disposed between the upper light outlet opening and the lower light outlet opening and a light source control circuit contained in the isolated internal space;
   an upper light emitting body attached on the upper light outlet opening provided at the upper surface of the light source part; and wherein light emitted from the LED is transmitted through the upper light outlet opening and to the light emitting body
   a power supply part located on the upper surface of the upper light emitting body and including a solar cell; and
   each linear light emitting unit comprises at least one optical fiber which is introduced into the hollow body through a hole formed at the junction portion and a transparent tube surrounding the optical fiber, wherein one end of the optical fiber is arranged at the light inlet opening of the hollow body, and wherein part of the optical fiber is extended outwards through the junction portion and connected to adjacent the point light emitting unit, and wherein light from the LED is transmitted downward through the lower light outlet opening and to the optical fiber.

2. An aquatic light emitting device according to claim 1, the junction portions are formed at opposite points of the floating member at which a central line of the floating member passes.

3. An aquatic light emitting device according to claim 1, the inlet opening corresponds to the lower outlet opening formed at the lower surface of the light source part.

* * * * *